United States Patent [19]

Blankemeyer et al.

[11] Patent Number: 5,054,600
[45] Date of Patent: Oct. 8, 1991

[54] TRANSFERRING SYSTEM FOR TRANSFERRING ARTICLES THROUGH A PROCESSING APPARATUS

[75] Inventors: James C. Blankemeyer, Columbus Grove; Robert L. Blankemeyer, Fort Jennings; James C. Miller, Lima, all of Ohio

[73] Assignee: MetoKote Equipment Corporation, Lima, Ohio

[21] Appl. No.: 471,951

[22] Filed: Jan. 29, 1990

[51] Int. Cl.⁵ .............................................. B65G 15/64
[52] U.S. Cl. ............................. 198/345.2; 198/346.3; 198/631; 118/423; 134/83
[58] Field of Search .................. 198/345.2, 346.3, 631, 198/681, 815; 118/423, 425; 134/71, 83

[56] References Cited

U.S. PATENT DOCUMENTS

| 2,831,454 | 4/1958 | Kearney | 118/423 |
| 2,997,191 | 8/1961 | Finston . | |
| 3,658,197 | 4/1972 | DiDonato . | |
| 3,684,080 | 8/1972 | Van Nest . | |
| 3,691,988 | 9/1972 | Clarke . | |
| 3,938,532 | 2/1976 | Babvnovic | 198/345.2 |
| 4,331,230 | 5/1982 | Buckley | 198/346.3 |
| 4,377,986 | 3/1983 | Juve . | |
| 4,436,764 | 3/1984 | Nakazima et al. | 118/423 |
| 4,575,299 | 3/1986 | Layton . | |

Primary Examiner—Joseph E. Valenza
Attorney, Agent, or Firm—Killworth, Gottman, Hagan & Schaeff

[57] ABSTRACT

A transferring system for use in a processing apparatus having a plurality of processing stations comprises an endless conveyor for conveying a plurality of articles along an endless conveying path through the plurality of processing stations. The transferring system includes a bridge assembly which displaces a portion of the conveyor located adjacent to the processing stations toward and away from the processing stations in order to allow the conveyor to transfer the articles into and out of the processing stations. The transferring system also includes a tensioning mechanism which takes up an excess amount of the conveyor as the portion of the conveyor moves away from the processing stations and which gives up an amount equal to the excess amount as the portion of the conveyor moves toward the processing stations.

16 Claims, 15 Drawing Sheets

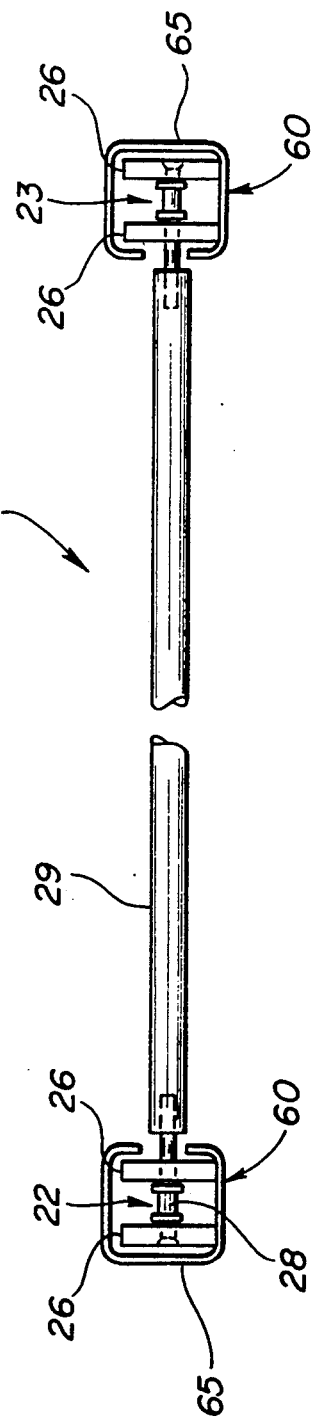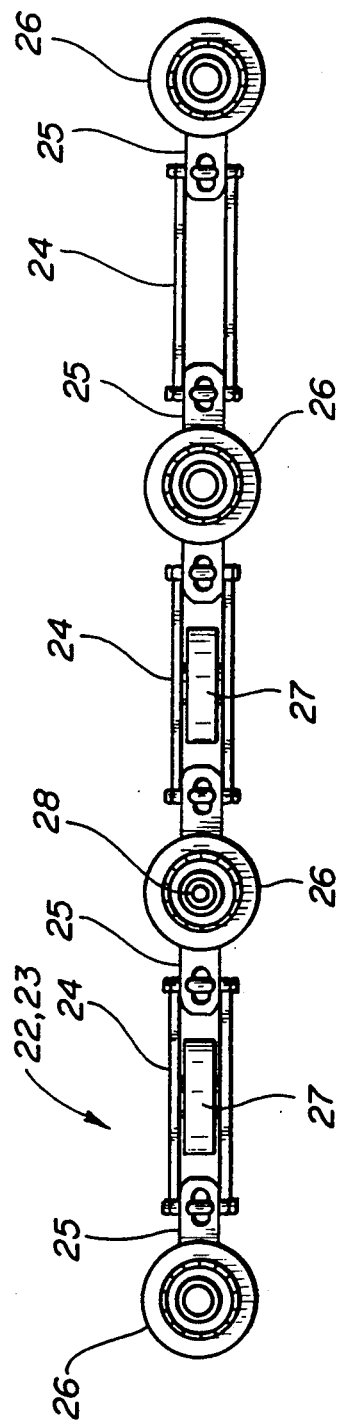

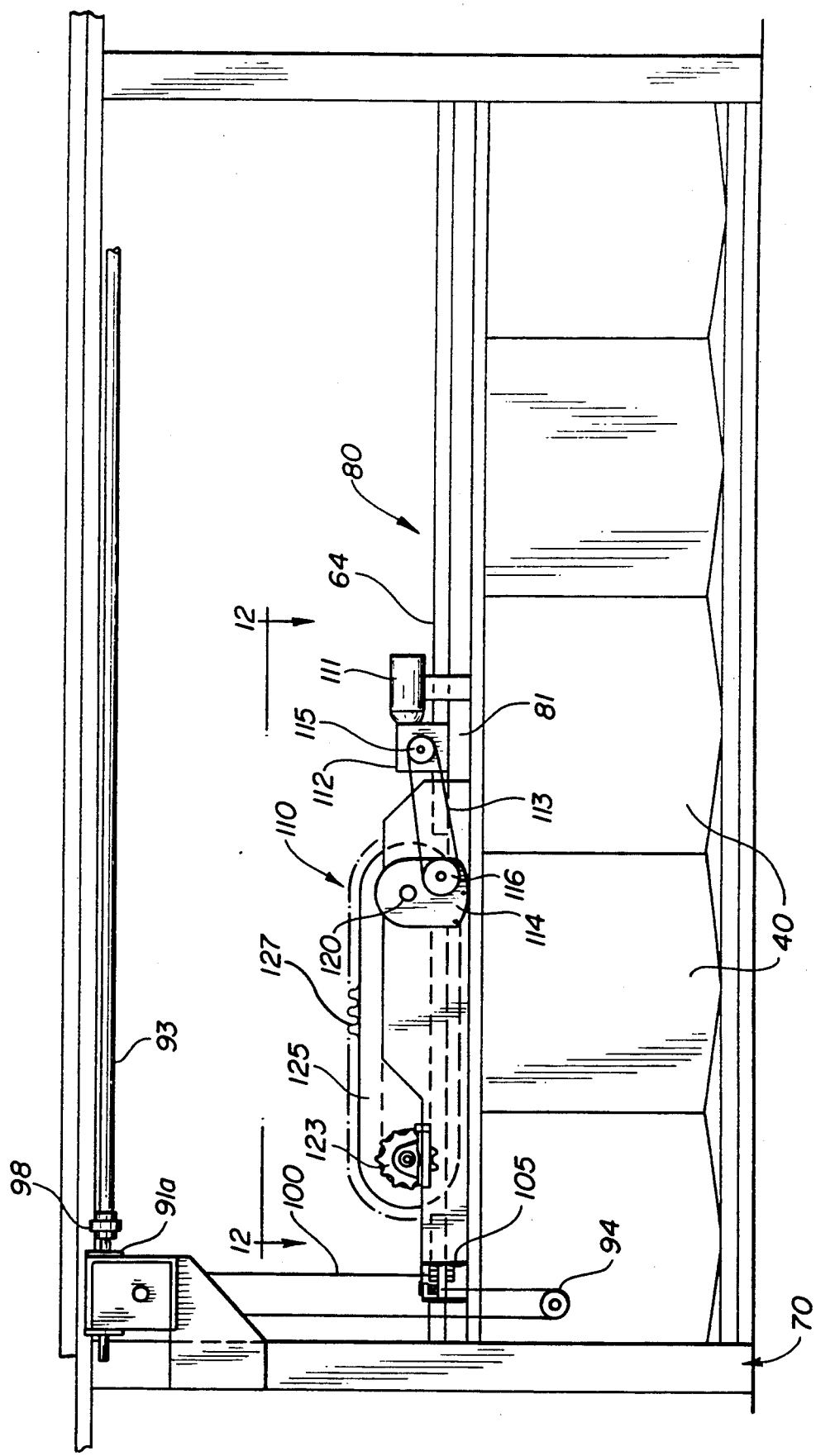

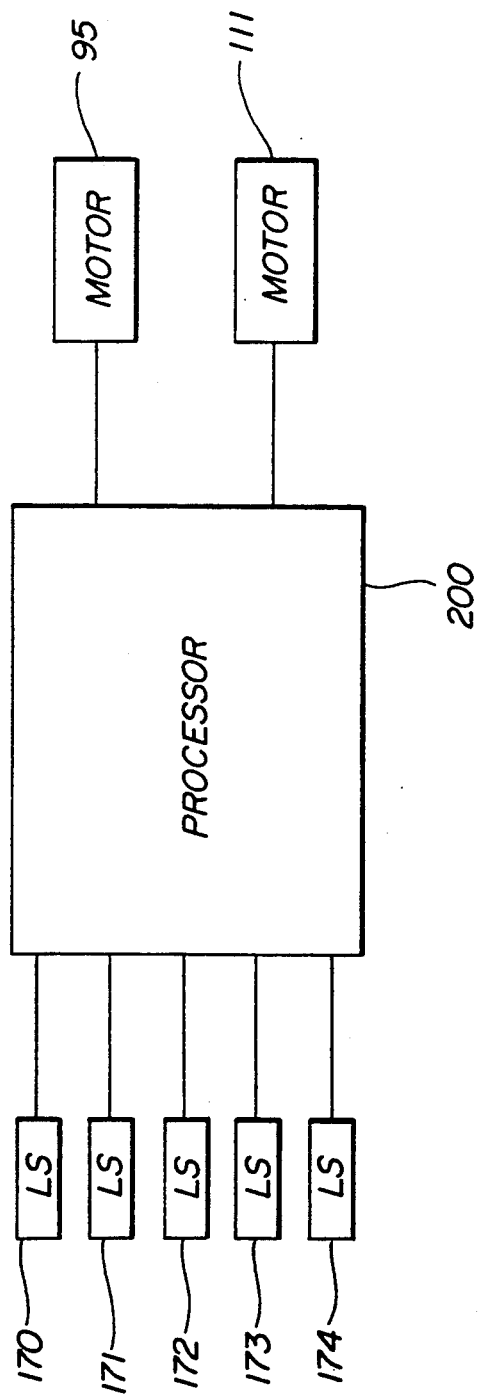

TRANSFERRING SYSTEM FOR TRANSFERRING ARTICLES THROUGH A PROCESSING APPARATUS

BACKGROUND OF THE INVENTION

The present invention generally relates to transferring systems useful in processing applications and, more particularly, to a transferring system for use in a processing apparatus having a plurality of processing stations for sequentially processing a plurality of articles as the articles are moved from station to station through the plurality of processing stations.

Transfer systems for transferring articles through a plurality of processing stations have long been utilized in practice in the prior art. For example, U.S. Pat. No. 3,658,197 describes a transferring system including a horizontal beam having a plurality of transferring units connected thereto for moving articles through a plurality of processing stations. The beam is moved vertically by a plurality of lifting units to lift the articles from the processing stations. The beam is further moved horizontally by way of a hydraulic piston-cylinder unit to move the articles to the next processing station. This system is problematic, however, since each transferring unit is confined to movement with the horizontal beam and thus can not move parts continuously along an endless path. Further, since the articles do not always remain attached to the transferring units while being processed in the stations, there is a risk that a transferring unit or an article will become misaligned resulting in an article not being picked up and properly transferred.

U.S. Pat. No. 2,997,191 describes a transferring system including a plurality of work carriers which move independently of one another to transfer workpieces through a plurality of processing stations. The work carriers are moved horizontally on rail sections by a plurality of pusher members located on two separate conveyor devices. The work carriers are also moved vertically to lift workpieces out of the processing stations by way of vertically movable rail sections. This system is disadvantageous since it requires more than one conveyor device having pusher members thereon in order to transfer the work carriers. Further, since the work carriers do not remain attached to a conveyor device, there is a risk that a pusher member on a conveyor device or a work carrier will become misaligned resulting in a workpiece not being properly transferred.

A further transferring system is known which is similar to the one described above in U.S. Pat. No. 2,997,191. This transferring system includes a plurality of work carriers which move independently of one another along rail sections to transfer workpieces through a plurality of processing stations. The work carriers are moved vertically to lift the workpieces out of the processing stations by vertically movable rail sections which are displaced by hydraulic actuators. The system is disadvantageous because it requires hydraulic actuators, which are expensive to install and problematic to maintain.

U.S. Pat. No. 4,377,986 discloses a transferring system, including a vertically reciprocating single-beam hoist having a plurality of transferring carts located thereon, for moving workpieces through a number of processing stations. The transferring carts are reciprocated horizontally along the hoist in order to transfer the workpieces between the processing stations. Since the transferring carts are confined to horizontal movement along the beam, the carts are not able to move workpieces continuously along an endless path. Further, since the workpieces do not always remain attached to the transferring carts while being processed in the stations, there is a risk that a cart or a workpiece will become misaligned resulting in a workpiece not being picked up and properly transferred.

U.S. Pat. No. 3,684,080 discloses a trolley conveyor system for use while unloading fowl, such as turkeys, from trucks. The system includes an endless cable having a plurality of trolleys connected thereto which move about an endless path on a track system. A portion of the trolley conveyor system is vertically displaceable in order to permit an operator to conveniently reach the birds at various levels on the bed of the truck. The conveyor system is capable of adjusting the overall length of the track system in order to compensate for the changes brought about by raising and lowering the displaced portion. This system is not useful in processing applications, however, since it is not employed with a processing apparatus having a plurality of processing stations for sequentially processing a plurality of articles.

Accordingly, a need exists for an alternative transferring system for transferring a plurality of articles through a Plurality of processing stations. An approach is desired in which a transferring system includes a series of work carriers connected to an endless conveyor traveling through an endless path with a portion of the endless conveyor capable of being displaced vertically in order to transfer a plurality of workpieces into and out of a plurality of processing stations.

SUMMARY OF THE INVENTION

In the present invention, a transferring system is employed in a processing apparatus having a series of work carriers connected to an endless conveyor for transferring workpieces through a plurality of processing stations. The endless conveyor is capable of being vertically displaced in order to transfer the workpieces into and out of the processing stations.

In accordance with one aspect of the present invention, an apparatus for processing articles through a plurality of processing stations comprises a plurality of processing stations for sequentially processing a plurality of articles as the articles are moved from station to station through the plurality of processing stations and endless conveyor means for conveying each of the articles along a conveying path. A section of the conveyor path is adjacent to the plurality of processing stations and the conveyor means is displaceable along the section of the conveying path for moving the plurality of articles into and out of the processing stations. The apparatus also includes guide means for guiding the endless conveyor means through the conveying path and for displacing a portion of the conveyor means located along the section of the conveying path. The guide means includes a movable displacement means for displacing the portion of the conveyor means, thereby allowing the conveyor means to move the plurality of articles into and out of the processing stations.

The movable displacement means is operable to displace the portion of the conveyor means from a first position to a second position in order to move the plurality of articles into the plurality of processing stations. The displacement means is also operable to displace the portion of the conveyor means from the second position to the first position in order to move the plurality of articles out of the plurality of processing stations.

The guide means further includes tensioning means for maintaining substantially constant tension on the endless conveyor means. The tensioning means takes up an excess amount of the conveyor means as the portion of the conveyor means moves from the second position to the first position and the tensioning means gives up an amount of the conveyor means equal to the excess amount as the portion moves from the first position to the second position. The tensioning means includes a weight for applying a substantially constant tensioning force to the conveyor means.

The movable displacement means comprises a bridge assembly means for guiding the conveyor means along the section of the conveying path and for moving the portion of the conveyor means toward and away from the plurality of processing stations. The movable displacement means also includes a plurality of reciprocating means for moving the bridge assembly means toward and away from the plurality of processing stations. Each of the plurality of reciprocating means comprises a pulley having a chain attached to the bridge assembly means. The movable displacement means further includes a common drive means for simultaneously driving the plurality of reciprocating means in a first direction thereby to allow the reciprocating means to move the bridge assembly means toward the plurality of processing stations. The common drive means also simultaneously drives the plurality of reciprocating means in a second direction thereby to allow the reciprocating means to move the bridge assembly means away from the plurality of processing stations. Each of the plurality of reciprocating means further includes a gear reducer coupled to the common drive means.

The common drive means includes a plurality of drive-shafts coupled with the plurality of reciprocating means for simultaneously driving each of the reciprocating means. The common drive means includes a plurality of coupling means for coupling the plurality of drive-shafts to the plurality of reciprocating means. The common drive means further includes a single motor means for driving the drive-shafts. The single motor means comprises a reversible brake-motor.

The apparatus further includes conveyor drive means located on the movable displacement means for driving the conveyor means along the conveying path. The conveyor drive means is actuated only when the portion of the endless conveyor means is in the first position.

The endless conveyor means comprises two endless chains having a plurality of transporting rods located between the endless chains.

In accordance with a further aspect of the present invention, an apparatus for coating articles through a plurality of coating stations comprises a plurality of coating stations for sequentially coating a plurality of articles as the articles are moved from station to station through the plurality of coating stations and endless conveyor means having a variable configuration for conveying each of the articles along a conveying path through the plurality of coating stations. The endless conveyor means displaces the plurality of articles into and out of the coating stations as the configuration of the conveyor means is varied. The apparatus also includes guide means for guiding the conveyor means through the conveying path and for varying the configuration of the conveyor means. The guide means includes a movable displacement means for displacing the endless conveyor means while varying the configuration of the conveying means to thereby allow the conveyor means to displace the plurality of articles into and out of the coating stations.

In accordance with another aspect of the present invention, an apparatus for processing articles through a plurality of processing stations comprises a plurality of processing stations for processing a plurality of articles as the articles are moved along a conveying path through the plurality of processing stations and endless conveyor means for conveying each of the articles along the conveying path. The conveyor means is displaceable along a section of the conveying path from a first position to a second position in order to move the plurality of articles into the processing stations and the conveyor means is displaceable along the section of the conveying path from the second position to the first position in order to move the articles out of the stations. The apparatus also includes guide means for guiding the endless conveyor means through the conveying path. The guide means includes tensioning means for maintaining constant tension on the endless conveyor means. The tensioning means takes up an excess amount of the conveyor means as the conveyor means moves from the second position to the first position and the tensioning means gives up an amount of the conveyor means equal to the excess amount as the conveyor means moves from the first position to the second position.

Accordingly, it is an object of this invention to provide a processing apparatus with an improved transferring system including a series of work carriers connected to an endless conveyor traveling through an endless path with a portion of the endless conveyor capable of being displaced vertically in order to transfer a plurality of workpieces into and out of a plurality of processing stations. This, and other objects and advantages of the present invention, will become apparent from the following detailed description, the accompanying drawings, and the appended claims.

BRIEF DESCRIPTION OF THE DRAWINGS

FIG. 8 is a cross-sectional view of the endless transfer conveyor of the present invention which comprises a plurality of loadbars and two endless conveyor chains;

FIG. 9 is a side view of a portion of one of the two endless conveyor chains shown in FIG. 8;

FIG. 10 is a schematic side view of the conveyor drive mechanism of the present invention;

FIG. 16 is a block diagram of a control system used in conjunction with the transferring system shown in FIG. 1.

DETAILED DESCRIPTION OF THE PREFERRED EMBODIMENT

Figure 1:
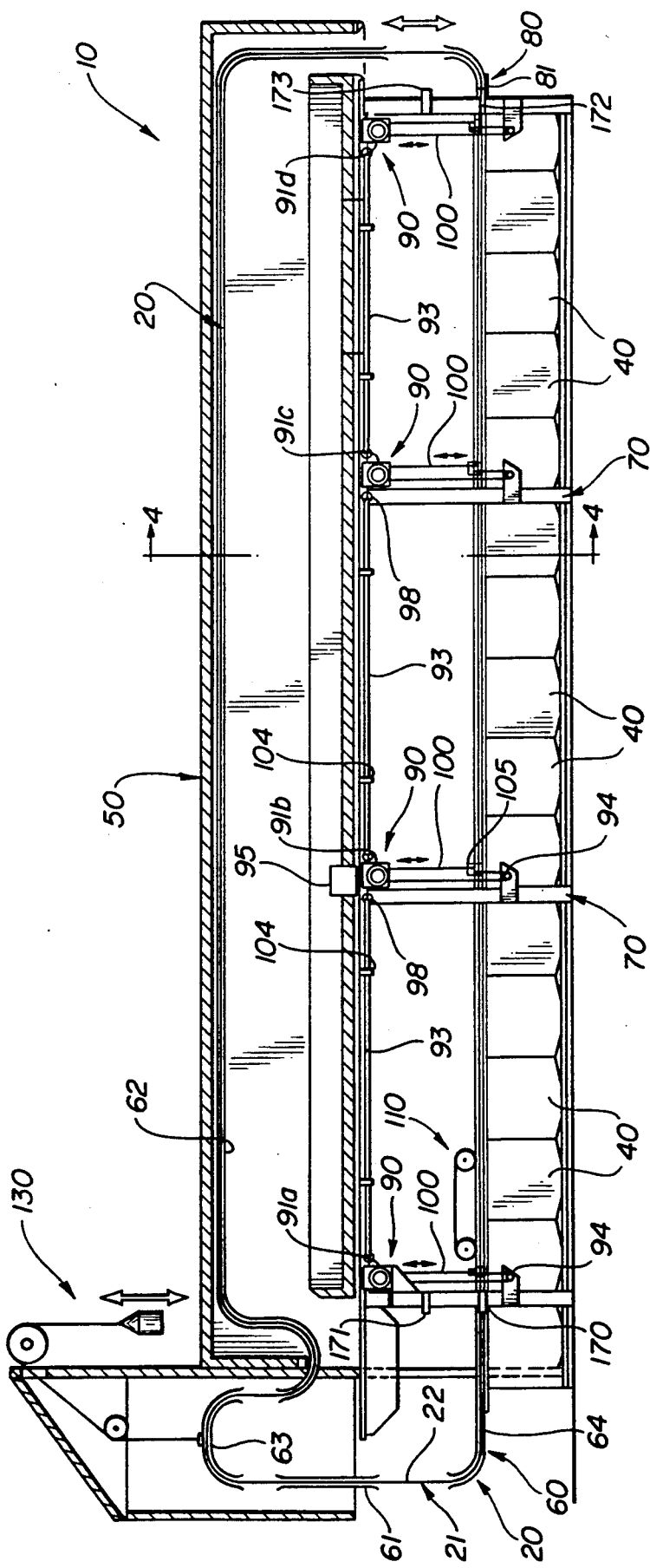
FIG. 1 is a schematic side elevational view, with parts in section, of a processing apparatus having the transferring system of the present invention therein and with the bridge assembly of the transferring system being located in the second position.
Figure 2:
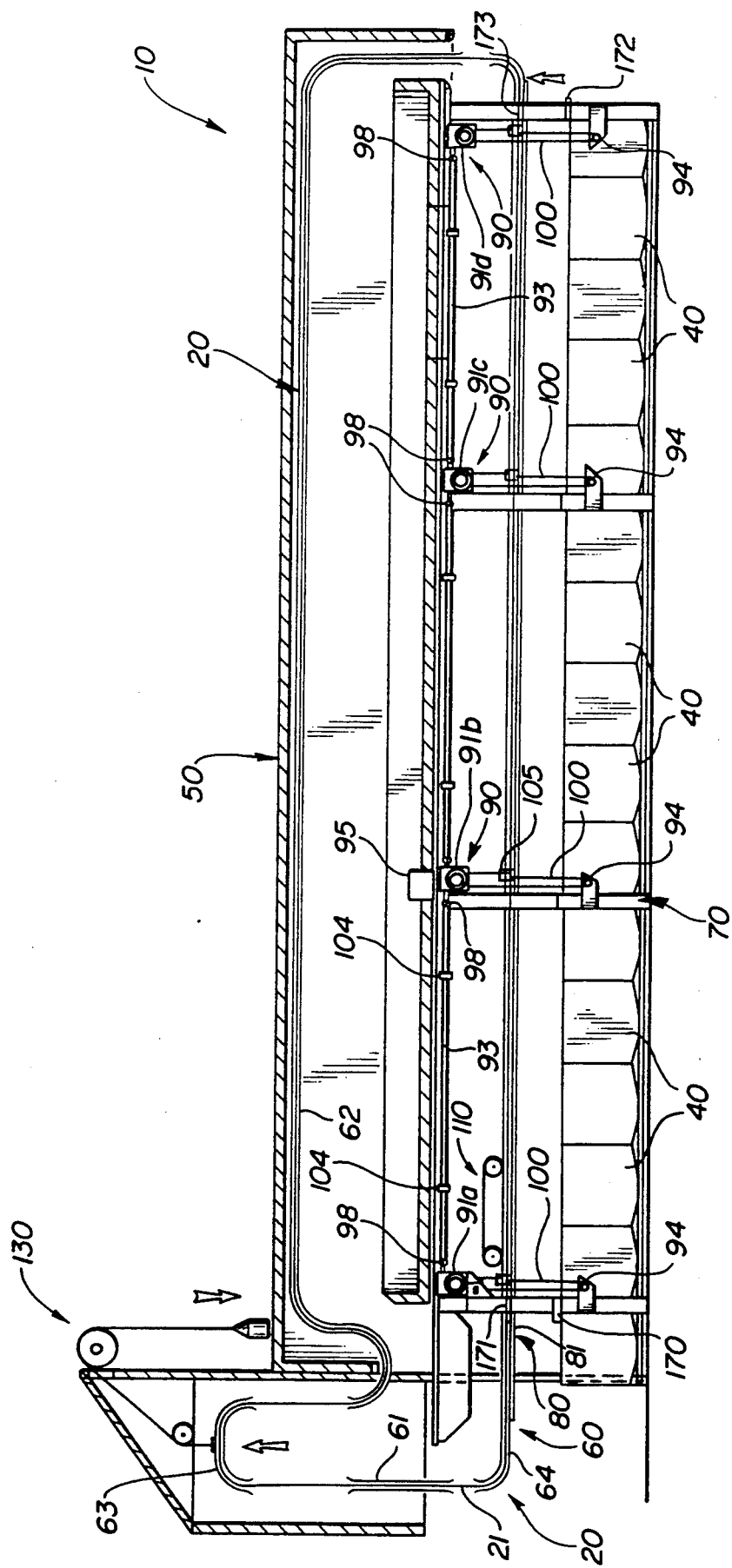
FIG. 2 is a schematic side elevational view, with parts in section, similar to FIG. 1, with the bridge assembly of the transferring system being located in the first position.
Figure 3:
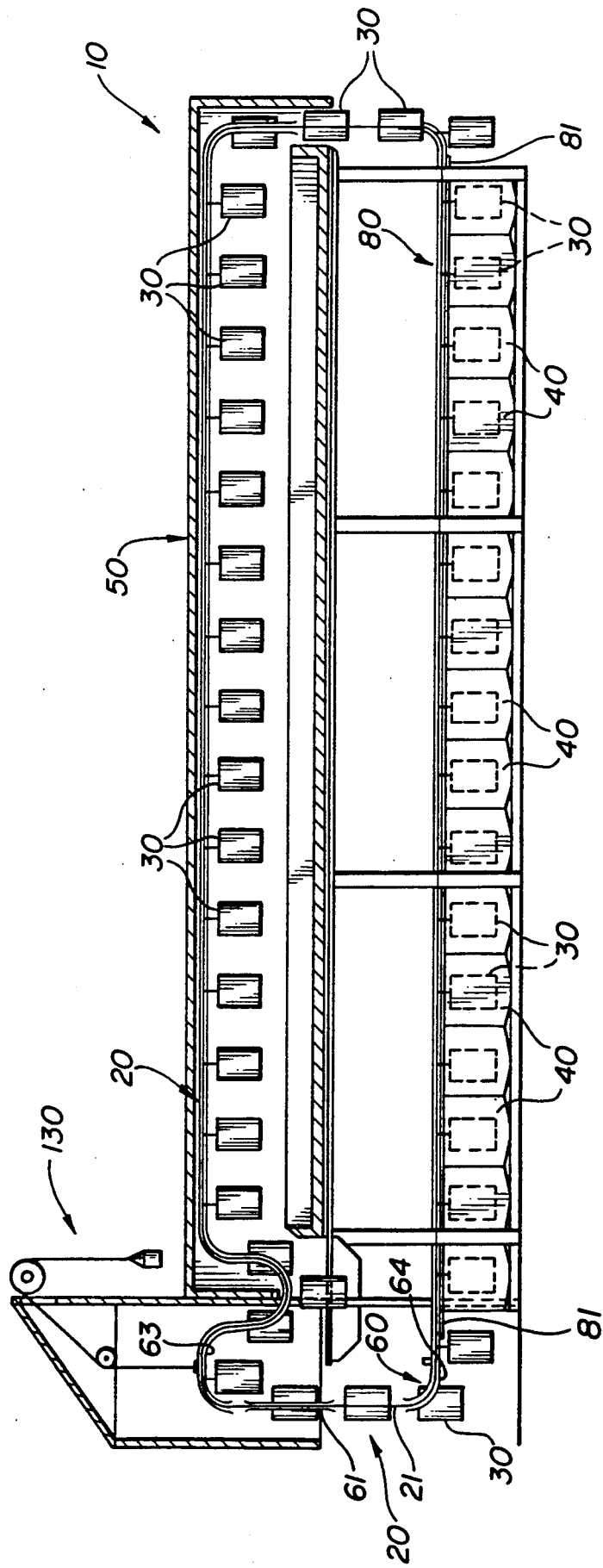
FIG. 3 is a schematic side elevational view, with the reciprocating devices taken away, of the transferring system having workpieces located thereon.

As shown in FIGS. 1-3, processing apparatus 10 comprises a frame 70 supporting a transferring system 20 for transferring a number of workpieces 30, seen in FIG. 3, through a plurality of processing tanks 40 disposed in a linear array. The apparatus may include a circulation chamber 50, such as an oven, through which the transferring system 20 may carry the workpieces 30 to allow them to dry or cure after they have passed through the processing tanks 40.

The processing tanks 40 may contain suitable processing solutions for carrying out any desired treating process on the workpieces 30 such as coating, plating, cleaning or the like. It will, of course, be appreciated that any number of tanks 40 may be utilized, the number depending on the particular process being employed.

Referring to FIGS. 1-4, the transferring system 20 of the present invention includes two sets of track sections 60, located above and on opposite sides of the plurality of processing tanks 40. The two sets of track sections 60 define an endless path within the apparatus 10 through which an endless transfer conveyor 21 travels. Each set of the two sets of track sections 60 includes a side fixed guide track 61 and an overhead fixed guide track 62. The fixed guide tracks are fixed in the sense that they do not have any appreciable vertical or horizontal displacement during operation of the transferring system 20. Each set of track sections 60 also includes a displaceable bridge assembly guide track 64 and a displaceable tensioning guide track 63. As will be discussed in more detail below, the displaceable track sections 63 and 64 permit the transferring 20 system to transfer the workpieces 30 into and out of the processing tanks 40.

The endless transfer conveyor 21, as seen in FIG. 8, comprises a first endless conveyor chain 22 and a second endless conveyor chain 23. Located between the first and second endless chains 22 and 23 are a plurality of loadbars 29 for carrying the workpieces 30 as the transfer conveyor 21 moves through the endless path within the apparatus 10.

Referring to FIG. 9, each endless chain 22 and 23 comprises first and second alternating links 24 and 25, respectively. The second links 25 are placed at 90 degrees to the first links 24 as the links are connected to one another. The second links 25 include a plurality of rollers 26 which rotate within guide track sections 60 to permit the endless transfer conveyor 21 to travel through the endless path within the apparatus 10.

A select number of rollers 26 include a fastener 28 for connecting a loadbar 29 to the chains 22 and 23. The specific rollers 26 having a loadbar 29 connected thereto depends upon the number of loadbars 29 required and the desired spacing between adjacent loadbars 29. The links 24 located on opposite sides of rollers 26 having a fastener 28 therein include an idler roller 27. Idler rollers 27 help maintain the chains 22 and 23 centered within guide track sections 60 and prevent the loadbars 29 from pressing the chains 22 and 23 toward the outerwalls 65 of the track sections 60.

Figure 4:
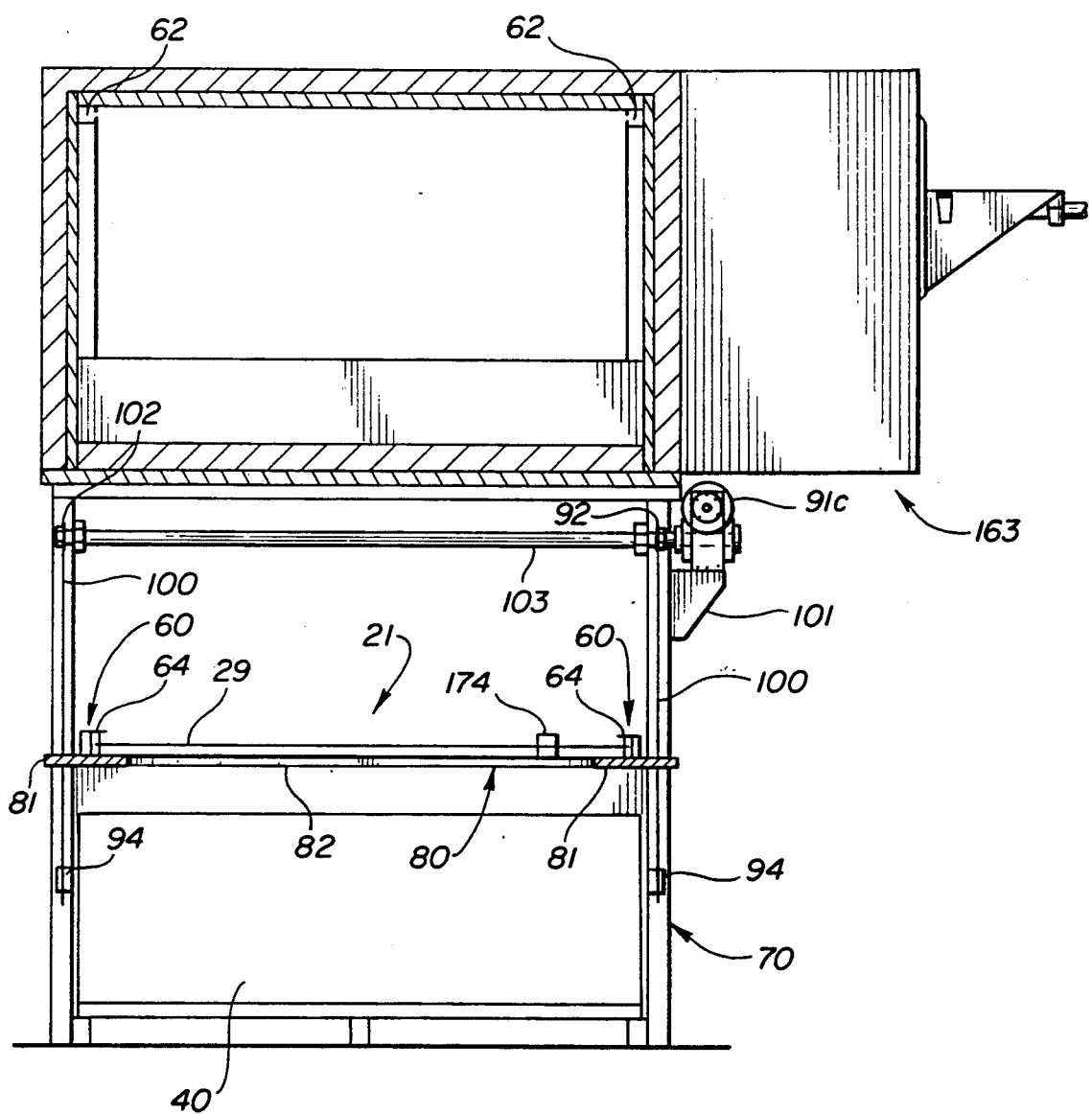
FIG. 4 is a cross-sectional view taken along line 4—4 of FIG. 1.
Figure 12:
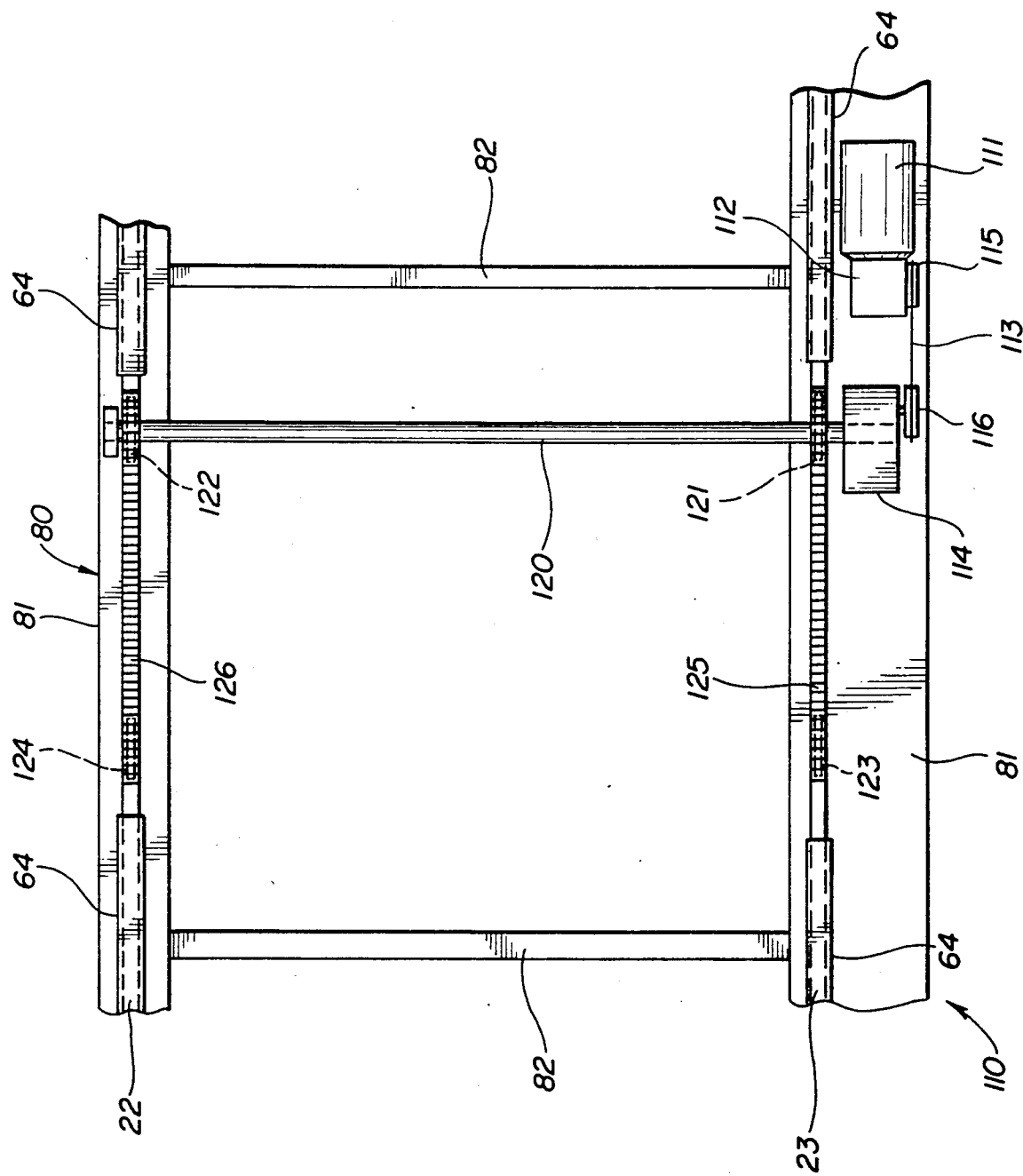
FIG. 12 is a top plan view of the conveyor drive mechanism shown in FIG. 10.

Referring to FIGS. 4 and 12, the transferring system 20 further includes a bridge assembly 80 which comprises two longitudinally extending support beams 81 connected to one another by a plurality of cross beams 82. Support beams 81 support the displaceable bridge assembly guide tracks 64. As will be discussed in more detail below, the bridge assembly guide tracks 64 vertically reciprocate with support beams 81. Bridge assembly 80, as seen in FIGS. 1-3, extends at both ends beyond the plurality of processing tanks 40. As seen in FIG. 4, bridge assembly 80 also extends across the width of the processing tanks 40.

Bridge assembly 80 is capable of being reciprocated from a second position, as seen in FIGS. 1 and 3, to a first position, as seen in FIG. 2, and visa versa. Referring specifically to FIG. 3, when the bridge assembly 80 moves from the first position to the second position, the workpieces 30 are each lowered into a respective one of the plurality of processing tanks 40 in order to be processed for a predetermined time. When the bridge assembly 80 moves from the second position to the first position, the workpieces 30 are vertically moved out of the processing tanks 40 in order to be moved horizontally to a subsequent tank 40.

Referring to FIGS. 1 and 2, it can be seen that the bridge assembly 80 is reciprocated from the first position to the second position, and visa versa, by a plurality of reciprocating devices 90. Reciprocating devices 90, as will be explained in more detail below, act simultaneously to raise and lower the bridge assembly 80 to insure that the bridge assembly 80 remains level at all times.

Figure 6:
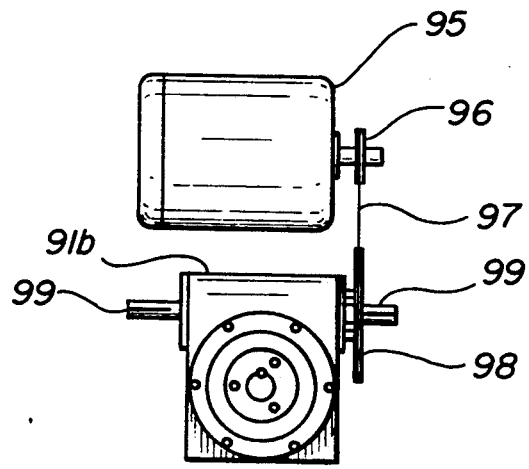
FIG. 6 is an enlarged view of the gear reducer drive motor and its associated gear reducer shown in FIG. 1.

Referring to FIGS. 4 and 6, reciprocating devices 90 include a plurality of gear reducers 91a–d supported on frame 70 by brackets 101. Located between the gear reducers 91a–d, as seen in FIGS. 1 and 2, are a number of drive shafts 93 which are rotatably supported to frame 70 by bearings 104. The gear reducers 91a–d are drivenly connected to one another by the drive shafts 93 which connect with the gear reducers 91a–d at input shafts 99 located on opposite sides of each gear reducer 91a–d. The drive shafts 93 are connected to input shafts 99 by way of couplings 98. Each drive shaft 93 is thus located between two adjacent gear reducers in order that the gear reducers 91a–d may be drivenly connected to one another.

As seen in FIGS. 1 and 2, one of the gear reducers 91b is drivenly connected to a motor means, preferably comprising a reversible brake-motor 95. The motor means may also comprise a single DC motor. Alternatively, instead of employing a motor means comprising a single motor connected to only one gear reducer, the motor means may comprise a plurality of lift motors, each connected to one of the gear reducers 91a–d. If a plurality of lift motors are used, they must be controlled so that they operate simultaneously in order to insure that the bridge assembly 80 remains level at all times.

Brake-motor 95, as seen in FIG. 6, drives gear reducer 91b by way of pulleys 96 and 98 and a drive belt 97 extending therearound. Since the gear reducers 91a-d are drivenly connected to one another by drive shafts 93, when motor 95 is rotated in either direction it simultaneously drives each gear reducer 91a-d in either a first or second direction. Since motor 95 simultaneously drives each gear reducer 91a-d when it rotates, each reciprocating device 90 will act concurrently to raise or lower the bride assembly 80, thereby insuring that the bridge assembly 80 remains level at all times.

Each of the gear reducers 91a-d preferably comprises a self-locking gear reducer. Such a gear reducer can only be driven from its input drive shaft and may not be driven from its output drive shaft. Thus, if the drive belt 97 breaks during the raising or lowering of the bridge assembly 80, the gear reducers 91a-d will no longer be driven and the bride assembly 80 will stop.

Each gear reducer 91a-d, only one of which is seen in FIG. 4, has associated therewith a sprocket drive shaft 103 which extends in a transverse direction to drive shafts 93 across the processing tanks 40. Each sprocket drive shaft 103 has located thereon a first and second output sprocket 92 and 102, respectively. As the gear reducers 91a-d rotate, each associated sprocket drive shaft 103 and the sprockets 92 and 102 located thereon also rotate.

Figure 5:
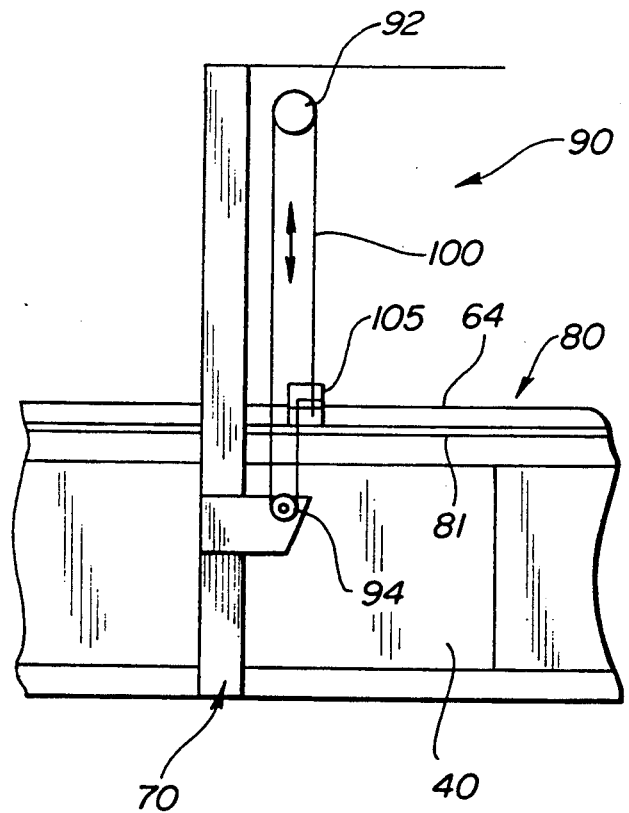
FIG. 5 is a side view of a reciprocating device with its respective gear reducer and drive shafts taken away.

Referring to FIGS. 4 and 5, each output sprocket 92 and 102 drives a chain or a cable 100 which is connected at both ends to the bridge assembly 80 by a fastener device 105. The frame 70 has connected thereto a plurality of idler sprockets 94 about which the chain 100 travels. As the output sprockets 92 and 102 are rotated in either direction, each chain 100 will travel about an idler sprocket 94 and move the bridge assembly 80 either toward or away from the processing tanks 40.

Figure 11:
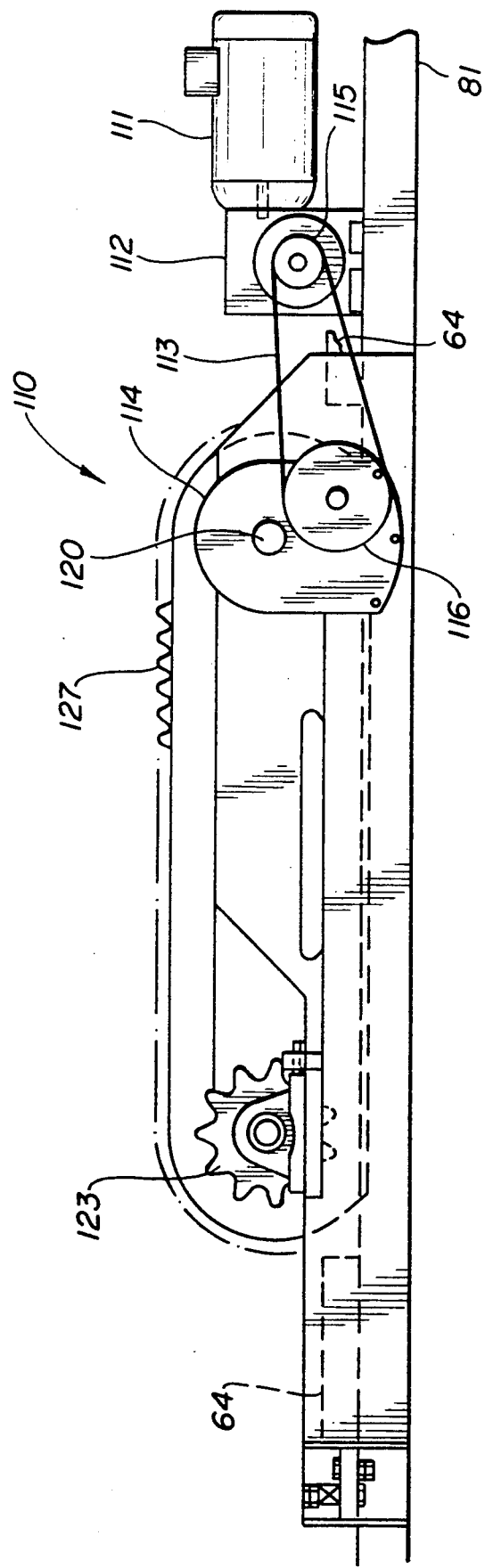
FIG. 11 is an enlarged view of the conveyor drive mechanism shown in FIG. 10.

Making reference now to FIGS. 10-12, the drive mechanism for the endless transfer conveyor 21, generally designed at 110, will be explained. The conveyor drive mechanism 110 is located on bridge assembly 80 and reciprocates vertically from the first position to the second position, and visa versa, along with bridge assembly 80. The conveyor drive mechanism 110 includes a brake-motor 111 connected to a first gear reducer 112. The first gear reducer 112 is drivenly connected to a second gear reducer 114 by way of pulleys 115 and 116 and a drive belt 113 extending therearound. The second gear reducer 114 has associated therewith a conveyor drive shaft 120 which extends across the width of the processing tanks 40, as seen in FIG. 12. The conveyor drive shaft 120 has located thereon first and second conveyor drive sprockets 121 and 122, respectively. Located upstream on bridge assembly 80, away from motor 111 as seen in FIG. 12, the drive mechanism 110 includes two idler sprockets 123 and 124. The drive mechanism 110 also includes a first drive chain 125 which extends around sprockets 121 and 123 and a second drive chain 126 which extends around sprockets 122 and 124. The drive chains 125 and 126a include a plurality of teeth 127d which are spaced along the entire length of each chain 125 and 126. When the drive chains 125 and 126 are rotated by motor 111, the teeth 127 located on chains 125 and 126 engage with conveyor chains 22 and 23 to transfer the chains 22 and 23 through the track sections 60. As the chains 22 and 23 are transferred through the track sections 60, the loadbars and nay workpieces 30 connected thereto are also transferred through the processing apparatus.

Figure 7A:
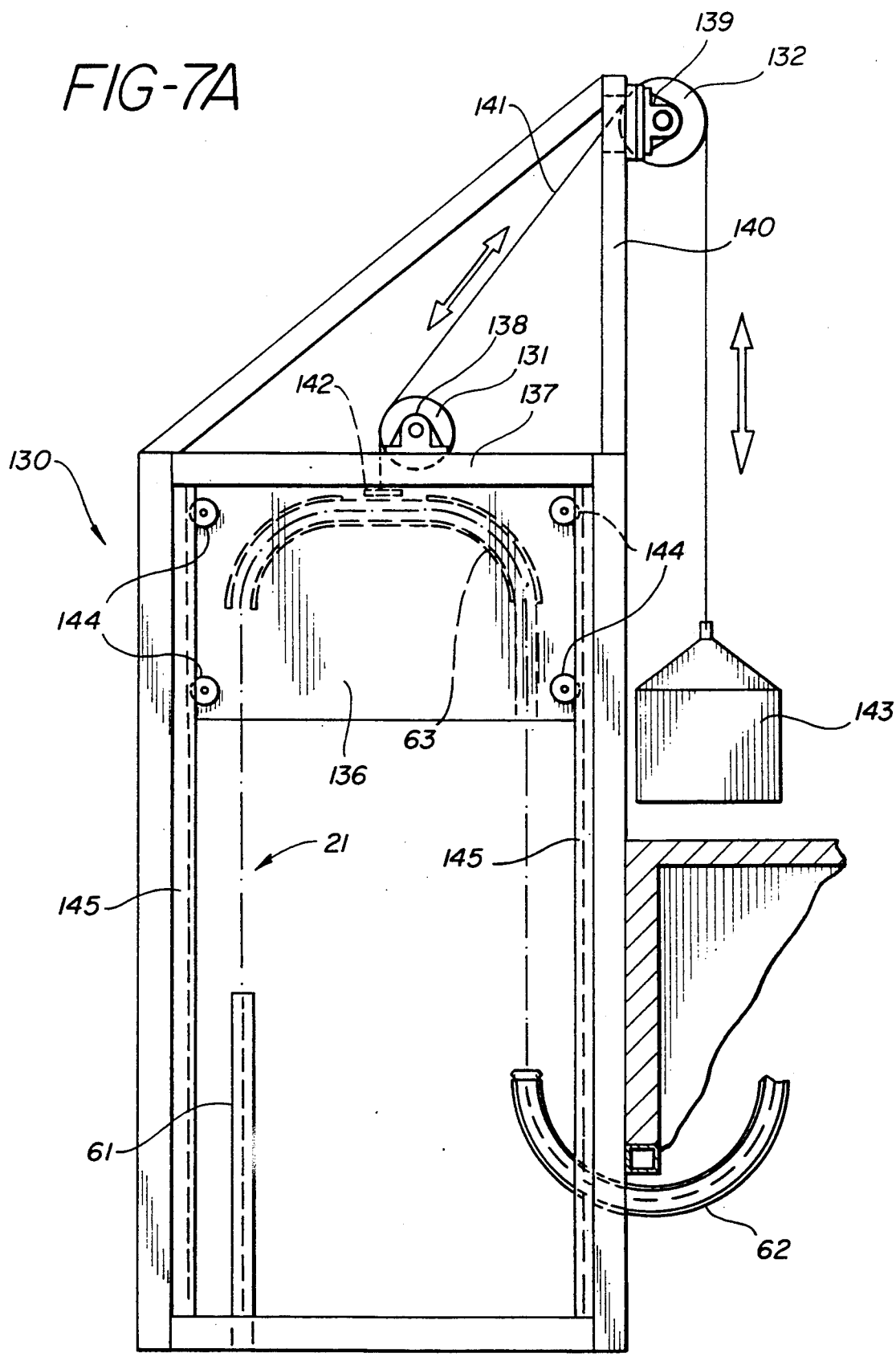
FIG. 7A is a schematic side view of the tensioning mechanism of the present invention.
Figure 7B:
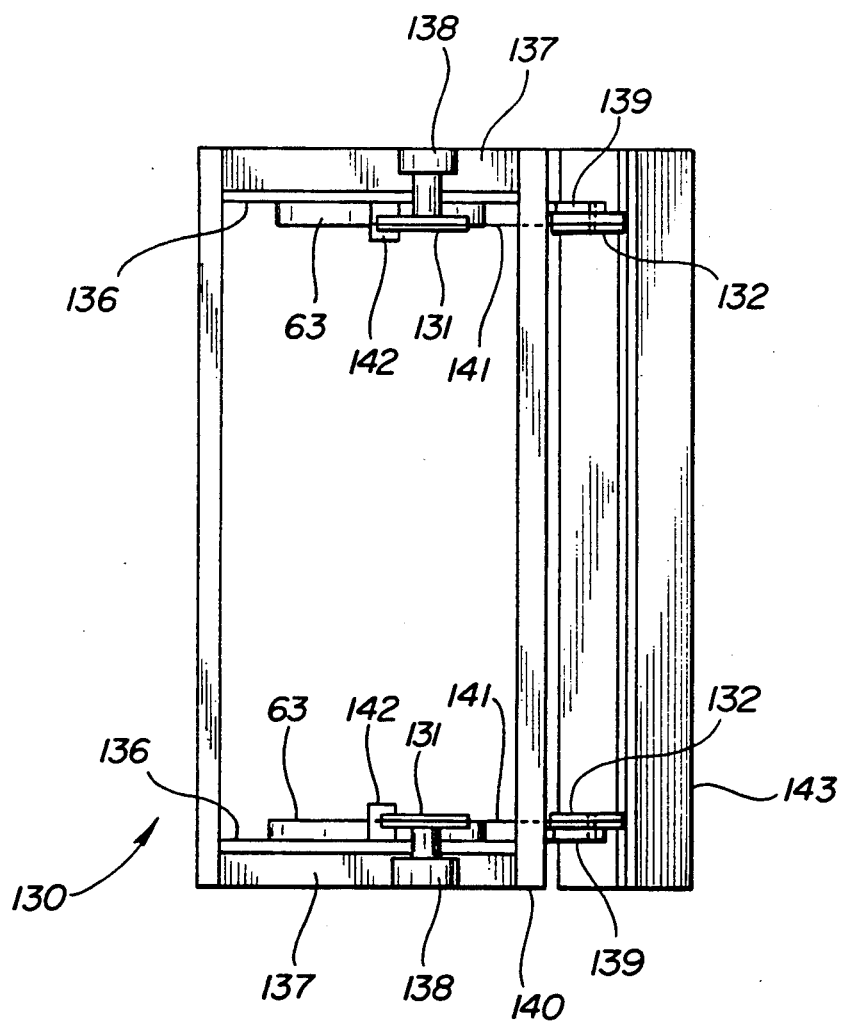
FIG. 7B is a top plan view of the tensioning mechanism shown in FIG. 7A.

Referring to FIGS. 7A and 7B, a tensioning mechanism 130 is shown which applies a substantially constant tension on the endless transfer conveyor 21. The tensioning mechanism 130 takes up an excess amount of the transfer conveyor 21 as the conveyor 21 withdraws the workpieces 30 from the processing tanks 40 and gives up an amount equal to the excess amount as the transfer conveyor 21 lowers the workpieces 30 into the processing tanks 40.

The tensioning mechanism 130 comprises two guide track plates 136, each of which has connected thereto one of the two displaceable tensioning guide tracks 63. Each guide track plate 136 includes a plurality of rollers 144 thereon which permit the plates 136 to move up and down in tracks 145. The tensioning mechanism further includes two upper support bars 137, each having connected thereto a first bearing 138 for rotatably supporting a first pulley 131. Two second pulleys 132 are rotatably supported by second bearings 139 connected to a support plate 140. Each set of first and second pulleys 131 and 132 has associated therewith a cable 141 which travels about the pulleys 131 and 132. Each cable 141 is attached at one end to one of the two guide track plates 136 by way of a connector 142. Each cable 141 is also attached at the other end to a weight 143. The weight applies a substantially constant tensioning force to each of the conveyor chains 22 and 23 by way of guide tracks 63. As a result, an excess amount of the conveyor chains 22 and 23 will be taken up as the workpieces are withdrawn by the bridge assembly 80 from the processing tanks 40 and an amount equal to the excess amount of the endless conveyor chains 22 and 23 will be given up as the workpieces 30 are lowered by the bridge assembly 80 into the processing tanks 40.

Figure 13:
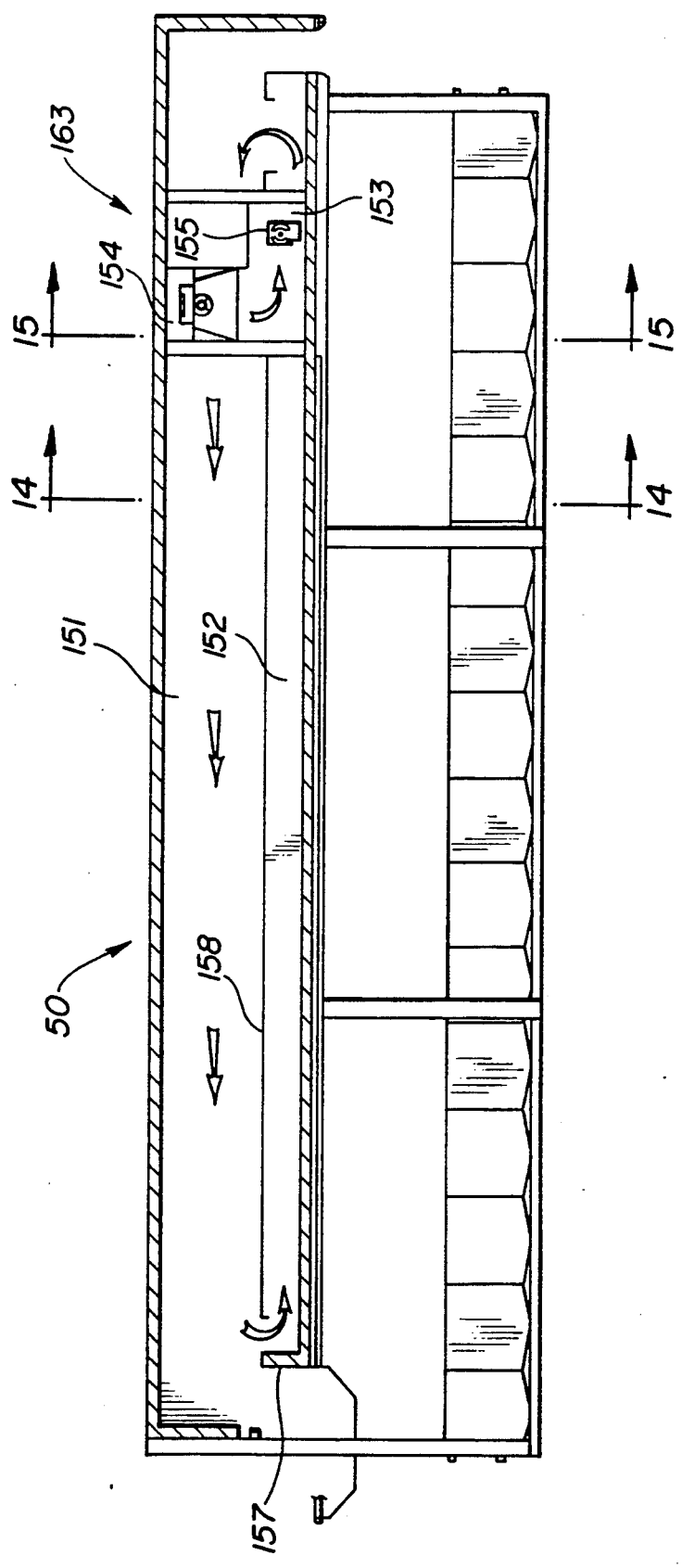
FIG. 13 is a schematic side elevational view, with the transferring system excluded, of a processing apparatus having a circulation chamber of the present invention.
Figure 14:
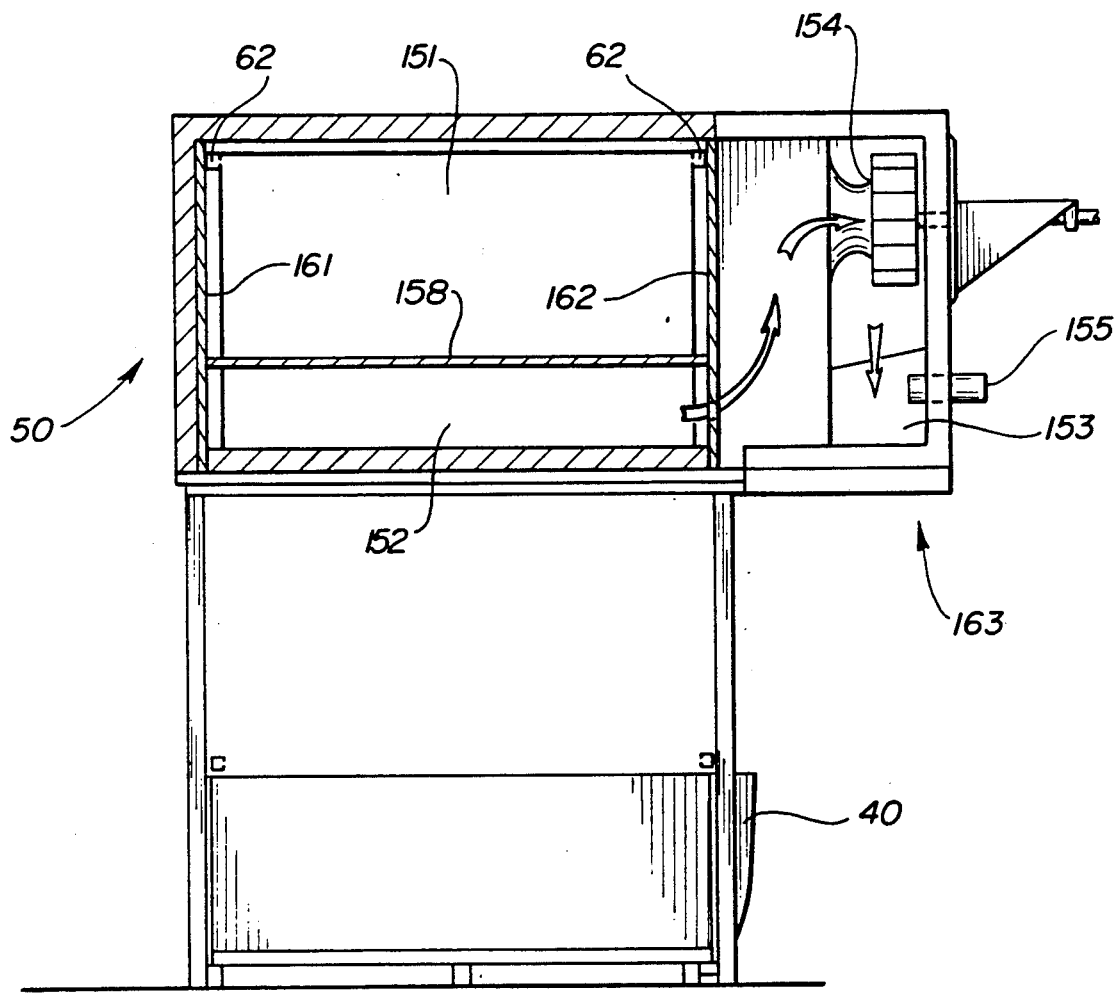
FIG. 14 is a cross-sectional view taken along line 14—14 of FIG. 13.
Figure 15:
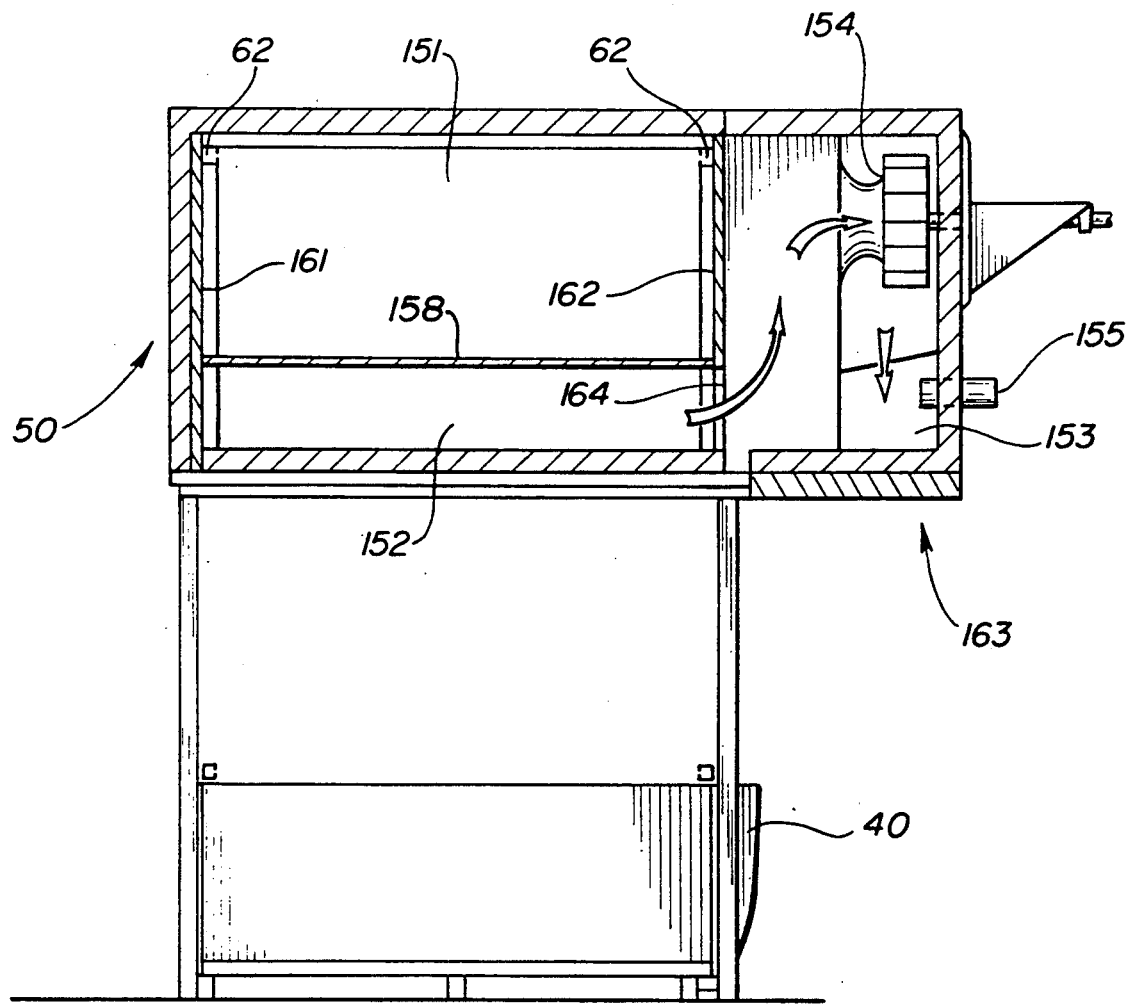
FIG. 15 is a cross-sectional view taken along line 15—15 of FIG. 13.

Turning to FIGS. 13-15, the circulation chamber 50 is shown which includes an upper main passageway 151 which has side walls 161 and 162. Located in the main passageway 151 on side walls 161 and 162 are the overhead fixed guide tracks 62. These guide tracks 62 permit the endless transfer conveyor 21 to carry the workpieces 30 through the circulation chamber 50.

The circulation chamber 50 also includes a return passageway 152, separated from main passageway 151 by a divider plate 158. The air travels, as shown by the arrows in FIGS. 13-15, through main passageway 151 into return passageway 152 where it enters into blower unit 163 to be recirculated through the chamber 50. The air enters into blower unit 163 through an opening 164 in side wall 162. The air is then drawn into blower 154 where it is recirculated out into the main passageway 151 via an output passageway 153. The output passageway 153 may include a heating unit 155 for heating the air before it enters main passageway 151.

The transferring system 20 is controlled by a plurality of limit switches 170-174 which send position signals to a processor 200, as seen in FIG. 16. Processors capable of performing the operations of this invention are well known in the art. Thus, any one of a number of well known processors may be used to perform the desired operations set forth herein. Limit switches 170-173 are located on the frame 70 as seen in FIG. 1. Limit switches 171 and 173 are upper limit switches and limit switches 170 and 172 are lower limit switches. As the bridge assembly 80 moves from the second position to the first position, as shown in FIG. 2, the upper limit switches 171 and 173 are actuated and a signal is sent to the processor 200 telling it that the bridge assembly 80 is in the first position. The processor 200 then sends a signal to the power supply circuit for brake-motor 95, instructing it to stop motor 95, thereby locking bridge assembly 80 in the first position, The processor 200 also sends a signal to the power supply for brake-motor 111, instructing it to supply power to motor 111, thereby driving transfer conveyor 21 in order that the workpieces 30 may be transferred horizontally to a subsequent processing tank 40.

The bridge assembly 80 has located therein a limit switch 174. When the transfer conveyor 21 has indexed the workpieces to a subsequent processing tank 40, one of the loadbars 29 will actuate limit switch 174. Limit switch 174 will then send a signal to the processor 200 telling it that the transfer conveyor 21 has horizontally transferred the workpieces 30 across to a subsequent processing tank 40. The processor 200 will then cause motor 111 to stop driving transfer conveyor 21 and to lock the transfer conveyor 21 at that position. The processor 200 will also cause motor 96 to begin lowering bridge assembly 80, by way of reciprocating devices 90, in order that the workpieces 30 may be lowered into the processing tanks 40.

When the bridge assembly 80 has reached that second position, it will actuate limit switches 170 and 172. Limit switches 170 and 172 will send a signal to the processor 200 telling it that bridge assembly 80 is now in the second position. The processor 200 will then cause power to be removed from brake-motor 95, thereby locking bridge assembly 80 in the second position. The processor 200 is pre-programmed to allow the workpieces to remain in the tanks 40 for a predetermined time. After this predetermined time period has been completed, the processor 200 will again cause brake-motor 95 to begin driving reciprocating devices 90, raising the bridge assembly from the second position to the first position.

It should be apparent that when the bridge assembly 80 is lowered from the first position to the second position, the portion of the transfer conveyor 21 that is located within guides 64 are also lowered with the bridge assembly 80. The transfer conveyor 21 is permitted to be lowered with the bridge assembly 80 since the tensioning mechanism 130, as discussed in detail above, gives up an excess amount of the transfer conveyor 21. Further, when the bridge assembly 80 is raised from the second position to the first position, the transfer conveyor 21 is permitted to be raised with the bridge assembly 80 since the tensioning mechanism 130 takes up the excess amount of the transfer conveyor 21.

Having thus described the transfer system of the present invention in detail and by reference to a preferred embodiment thereof, it will be apparent that modifications and variations are possible without departing from the scope of the invention defined in the appended claims.

What is claimed is:

1. An apparatus for processing articles through a plurality of processing stations comprising:
   a plurality of processing stations for sequentially processing a plurality of articles as said articles are moved from station to station through said plurality of processing stations;
   endless conveyor means for conveying each of said articles along a conveying path, a section of said conveying path being adjacent to said plurality of processing stations, said conveyor means being displaceable along said section of said conveying path for moving said plurality of articles into and out of said processing stations;
   guide means for guiding said endless conveyor means through said conveying path and for displacing a portion of said conveyor means located along said section of said conveying path, said guide means including a movable displacement means for actively displacing only said portion of said conveyor means from a first position to a second position in order to move said plurality of articles into said plurality of processing stations and for displacing said portion from said second position to said first position in order to move said plurality of articles out of said plurality of processing stations;
   conveyor drive means for driving said endless conveyor means along said conveying path; and
   processor means for controlling the operation of said conveyor drive means so that said conveyor drive means is only actuated to drive said endless conveyor means along said conveying path when said portion of said endless conveyor means is in said first position.

2. The apparatus as defined in claim 1, wherein said guide means further includes tensioning means for maintaining substantially constant tension on said endless conveyor means, said tensioning means taking up an excess amount of said conveyor means as said portion moves from said second position to said first position and said tensioning means giving up an amount of said conveyor means equal to said excess amount as said portion moves from said first position to said second position.

3. The apparatus as defined in claim 2, wherein said tensioning means includes a weight for applying a substantially constant tensioning force to said conveyor means.

4. The apparatus as defined in claim 1, wherein said movable displacement means comprises:
   bridge assembly means for guiding said conveyor means along said section of said conveying path and for moving said portion of said conveyor means toward and away from said plurality of processing stations;
   a plurality of reciprocating means for moving said bridge assembly means toward and away from said plurality of processing station, each of said plurality of reciprocating means being attached to said bridge assembly means; and
   a common drive means for simultaneously driving said plurality of reciprocating means.

5. The apparatus as defined in claim 4, wherein each of said plurality of reciprocating means comprises a pulley having a chain attached to said bridge assembly means.

6. The apparatus as defined in claim 4, wherein said common drive means includes a plurality of drive-shafts coupled with said plurality of reciprocating means for simultaneously driving each of said reciprocating means.

7. The apparatus as defined in claim 6, wherein said common drive means includes a plurality of coupling means for coupling said plurality of drive-shafts to said plurality of reciprocating means.

8. The apparatus as defined in claim 5, wherein each of said plurality of reciprocating means further comprises a gear-reducer coupled to said common drive means.

9. The apparatus as defined in claim 6, wherein said common drive means further includes a single motor means for driving said plurality of drive-shafts.

10. The apparatus as defined in claim 9, wherein said single motor means comprises a reversible brake-motor.

11. The apparatus as defined in claim 1, wherein said movable displacement means comprises:
bridge assembly means for guiding said conveyor means along said section of said conveying path and for moving said portion of said conveyor means toward and away from said plurality of processing station;
a plurality of reciprocating means for moving said bridge assembly means toward and away from said plurality of processing stations, each of said plurality of reciprocating means being attached to said bridge assembly means; and
a common drive means for simultaneously driving said plurality of reciprocating means in a first direction thereby allowing said reciprocating means to move said bridge assembly means toward said plurality of processing stations and said common drive means simultaneously driving said plurality of reciprocating means in a second direction thereby allowing said reciprocating means to move said bridge assembly means away from said plurality of processing stations.

12. The apparatus as defined in claim 4, wherein said common drive means includes a plurality of drive-shafts coupled with said plurality of reciprocating means for simultaneously driving each of said reciprocating means.

13. The apparatus as defined in claim 12, wherein said common drive means further includes a single motor means for driving said common drive-shaft.

14. The apparatus as defined in claim 13, wherein said single motor means comprises a reversible brake-motor.

15. The apparatus as defined in claim 1, wherein said conveyor drive means is located on said movable displacement means.

16. The apparatus as defined in claim 1, wherein said endless conveyor means comprises two endless chains having a plurality of transporting rods located between said endless chains.

* * * * *

UNITED STATES PATENT AND TRADEMARK OFFICE
CERTIFICATE OF CORRECTION

PATENT NO. : 5,054,600

DATED : October 8, 1991

INVENTOR(S) : James C. Blankemeyer et al

It is certified that error appears in the above-identified patent and that said Letters Patent is hereby corrected as shown below:

Col. 10, line 44,     "processing station" should be --processing stations--.

Col. 11, line 9,     "processing station" should be --processing stations--.

Col. 12, line 4,     "claim 4" should be --claim 11--.

Signed and Sealed this

Sixteenth Day of March, 1993

Attest:

STEPHEN G. KUNIN

Attesting Officer     Acting Commissioner of Patents and Trademarks